(12) United States Patent
Saito

(10) Patent No.: US 6,884,021 B2
(45) Date of Patent: Apr. 26, 2005

(54) SINGLE CASCADE MULTISTAGE TURBINE

(75) Inventor: Yoshio Saito, Tokyo (JP)

(73) Assignee: National Aerospace Laboratory of Japan, Chofu (JP)

( * ) Notice: Subject to any disclaimer, the term of this patent is extended or adjusted under 35 U.S.C. 154(b) by 57 days.

(21) Appl. No.: 10/401,669

(22) Filed: Mar. 31, 2003

(65) Prior Publication Data

US 2003/0185680 A1 Oct. 2, 2003

(30) Foreign Application Priority Data

Apr. 2, 2002 (JP) ........................................ 2002-100541

(51) Int. Cl.[7] ................................................ F01D 1/12
(52) U.S. Cl. ....................... 415/57.1; 415/57.3; 415/185
(58) Field of Search ................................. 415/202, 185, 415/57.1, 57.3, 54.1

(56) References Cited

U.S. PATENT DOCUMENTS 3,070,349 A       12/1962  Stewart et al. ................. 253/66
3,138,363 A   *   6/1964   Banerian ..................... 415/57.3

FOREIGN PATENT DOCUMENTS

GB    2 235 018    2/1991
JP    55-49507     4/1980

* cited by examiner

Primary Examiner—Edward K. Look
Assistant Examiner—Dwayne J. White
(74) Attorney, Agent, or Firm—Westerman, Hattori, Daniels & Adrian LLP

(57) ABSTRACT

This invention provides a single cascade multistage turbine that has a compact turbine structure having only a single cascade, and enables power to be extracted efficiently in the same way as a multistage turbine having multistage rotor vanes. The working fluid supplied through the supply duct 3 flows on one side of the single cascade of rotor vanes 2 to one part of the circumference direction of the rotor vanes 2, and after passing through the rotor vanes 2 it passes through the circulation ducts 4a and 4b and returns to the former side of the rotor vanes 2. The circulation ducts 4a and 4b consist of exhaust duct members 6a and 6b, return duct members 7a and 7b, and inflow duct members 8a and 8b. Using the circulation ducts 4a and 4b this circulation process is repeated at least once whereby the working fluid is again passed through the rotor vanes 2 at a slightly different position in the circumferential direction of the rotor vanes 2. Each time the working fluid is passed through the rotor vanes 2, the energy contained in the fluid can be efficiently extracted as torque of the rotor vanes 2.

5 Claims, 2 Drawing Sheets

SINGLE CASCADE MULTISTAGE TURBINE

BACKGROUND OF THE INVENTION

1. Field of the Invention

The present invention relates to a single cascade multistage turbine that functions as a multistage turbine while having a single cascade of rotor vanes.

2. Description of the Related Art

Conventionally, a multistage turbine is known as a device for efficiently converting the energy contained in a fluid into power. A multistage turbine is a turbine that repeats a process consisting of converting energy contained in a fluid into power by a rotating cascade of rotor vanes, then guiding the fluid with reduced pressure to another cascade of rotor vanes located downstream, and converting the energy in the fluid into power.

However, with the multistage turbines currently used, in the case where the peripheral velocity of the blades is set to a particular value, in order to convert the energy contained in the fluid into power with a sufficient degree of efficiency even when the working fluid is at high pressure, it is necessary to increase the number of turbine stages, in other words the number of cascades. Increasing the number of cascades in a multistage turbine immediately creates the problems of complicating the turbine construction, increasing manufacturing cost and reducing ease of maintenance.

Therefore, the remaining problem of enabling the energy contained in the fluid to be efficiently converted into power in the same way as a multistage turbine, without increasing the number of cascades needs to be resolved.

SUMMARY OF THE INVENTION

An object of the present invention is to eliminate the flaws in the above-mentioned conventional technology, specifically by providing a single cascade multistage turbine that enables the efficient extraction of power in the same way as a multistage turbine having multiple stages of rotor vanes, without reducing ease of maintenance and avoiding an increase in manufacturing cost, by constructing a turbine with a compact configuration that only comprises a single cascade.

In the single cascade multistage turbine according to the present invention, a working fluid circulation process is repeated at least once, the circulating process comprising: causing the working fluid to flow on one side of a single cascade of rotor vanes to one part of the circumferential direction of the rotor vanes; returning the working fluid that has passed through the rotor vanes to the former side of the rotor vanes; and again passing the working fluid through the rotor vanes at a slightly different position in the circumferential direction of the rotor vanes; and power is extracted from the working fluid each time the working fluid passes through the rotor vanes.

According to this single cascade multistage turbine, a circulation process in which after the working fluid has flowed on one side of the single cascade of rotor vanes to one part of the circumferential direction of the rotor vanes and passed through the rotor vanes, it returns to the former side of the rotor vanes and passes again through the rotor vanes at a slightly different position in the circumferential direction of the rotor vanes is repeated at least once. Each time the working fluid is passed through the rotor vanes its pressure decreases; however the energy contained in the fluid is extracted as torque of the rotor vanes, in accordance with the amount of pressure reduction. Consequently, the energy contained in the fluid can be extracted efficiently.

In this single cascade multistage turbine, the working fluid that is supplied through the supply duct and passes through the rotor vanes then divides into a plurality of streams and the circulation process can be conducted with respect to each stream of working fluid thus divided. In this way, by dividing the working fluid into a plurality of streams and conducting the circulation process with respect to each stream, even with a low number of repetitions of the circulation process, the circulation process of the working fluid is conducted using the whole or a wide area of the circumferential direction of the rotor vanes and power from the working fluid can be extracted.

The single cascade multistage turbine can be applied to a fan or a compressor having moving vanes by attaching the rotor vanes to the tips of the moving vanes, and by driving the moving vanes with the power extracted from the working fluid to the rotor vanes.

Further, the single cascade multistage turbine according to the present invention comprises a single cascade of rotor vanes; a supply duct for causing the working fluid to flow on one side of the rotor vanes to one part of the circumferential direction of the rotor vanes; one or more circulation ducts each having an exhaust duct member through which the working fluid that has passed through the rotor vanes is drained out, a return duct member to return the working fluid to the former side of the rotor vanes, and an inflow duct member connected to the return duct member, which supplies the working fluid to the rotor vanes at a slightly different position in the circumferential direction of the rotor vanes; and an exhaust port to discharge the fluid that has returned through the final circulation duct of the circulation ducts and passed through the rotor vanes.

According to this single cascade multistage turbine, the working fluid flows into one part of the circumferential direction of the rotor vanes through the supply duct provided on one side of the single cascade of rotor vanes, and passes through the rotor vanes. After passing through the rotor vanes, the working fluid repeats the circulation process of passing through the rotor vanes by the circulation ducts at least once. In other words, from the exhaust duct member of the circulation duct, the fluid returns to the former side of the rotor vanes through the return duct, and from the inflow duct connecting to the return duct, the fluid passes through the rotor vanes at a slightly different position in the circumferential direction of the rotor vanes. After returning through the final circulation duct, the working fluid that has passed through the rotor vanes is discharged from the exhaust port. Each time it passes through the rotor vanes, the pressure of the working fluid decreases, however, the energy contained in the fluid is extracted as torque of the rotor vanes, in accordance with the amount of pressure reduction. Consequently, the energy contained in the fluid can be extracted efficiently.

In this single cascade multistage turbine, the working fluid that is supplied through the supply duct and passes through the rotor vanes then divides into a plurality of streams, and a circulation duct can be provided for each stream of working fluid thus divided. By dividing the working fluid into several streams and providing a circulation duct for each stream, even with a low number of repetitions of the circulation process, the circulation process of the working fluid is conducted using the whole or a wide area of the circumferential direction of the rotor vanes and power from the working fluid can be efficiently extracted.

This single cascade multistage turbine can be applied to a fan or a compressor having moving vanes by attaching the rotor vanes to the tips of the moving vanes, and by driving the moving vanes with the power extracted from the working fluid to the rotor vanes. The extracted power can thus be used efficiently in a fan or compressor.

DESCRIPTION OF THE PREFERRED EMBODIMENTS

Figure 1:
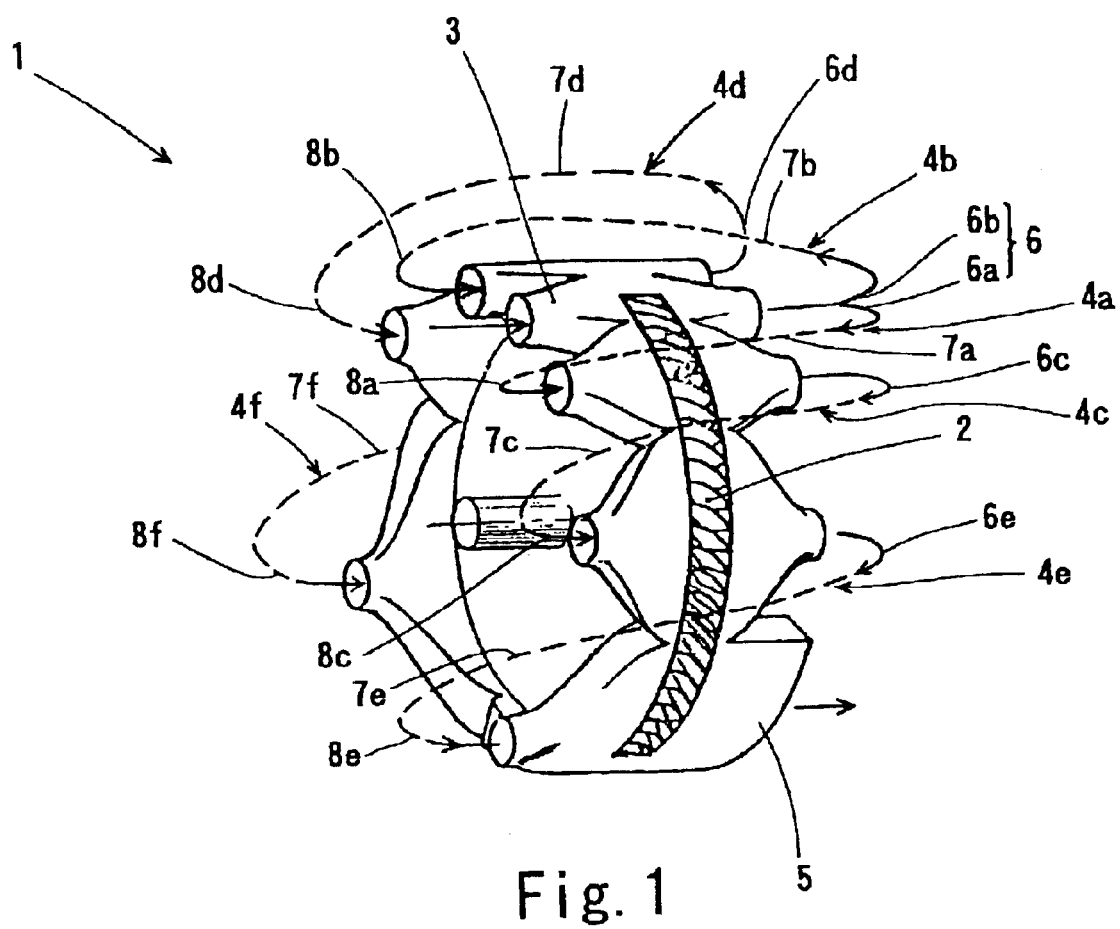
FIG. 1 is a perspective view of an embodiment of a single cascade multistage turbine according to the present invention.

An embodiment of a single cascade multistage turbine according to the present invention will be described with reference to the drawings. As shown in FIG. 1, a single cascade multistage turbine 1 comprises a single cascade of rotor vanes 2, a supply duct 3, at least one circulation duct 4, and an exhaust port 5. The single cascade of rotor vanes 2 may for example be attached around a rotatable vane wheel (not shown in the drawing) and there are no differences from the cascade construction of a conventional single vane wheel. The supply duct 3 that supplies the working fluid is provided in one place on the casing (not shown in the drawing) of the single cascade multistage turbine 1, and the supply duct 3 extends to the circumferential direction of the rotor vanes 2 to an area that is only a portion of the total circumference. When the working fluid that is supplied through the supply duct 3 towards the rotor vanes 2 passes through the rotor vanes 2, part of the energy contained in the working fluid is extracted as the rotational driving force for the vane wheel on which the rotor vanes 2 are attached.

An exhaust duct 6 is provided in a position facing the supply duct 3 across the rotor vanes 2. The exhaust duct 6 is divided into two exhaust duct members 6a and 6b, and the working fluid that is supplied through the supply duct 3 and passes through the rotor vanes 2 is discharged into each exhaust duct member 6a and 6b. The exhaust duct members 6a and 6b are connected to return duct members 7a and 7b respectively, and the return duct members 7a and 7b are connected to inflow duct members 8a and 8b respectively. The combination of the exhaust duct member 6a, the return duct member 7a and the inflow duct member 8a constitute a single unit, namely a circulation duct 4a, and the combination of the exhaust duct member 6b, the return duct member 7b and the inflow duct member 8b likewise constitute a single unit, namely a circulation duct 4b. According to this configuration, the working fluid that is discharged to the exhaust duct 6 is divided and returned through the return ducts 7a and 7b to the inflow ducts 8a and 8b separately positioned on each side of the circumferential direction of the supply duct 3. The inflow ducts 8a and 8b of the circulation ducts 4a and 4b have a similar function to the supply duct 3, sending the working fluid toward the rotor vanes 2. Part of the energy contained in the working fluid supplied from the inflow duct members 8a and 8b to the rotor vanes 2 is extracted at the rotor vanes 2. The pressure of the working fluid that passes through the rotor vanes 2 decreases according to the power extracted.

In this embodiment, the streams of working fluid that are circulated through the circulation ducts 4a and 4b and pass through the rotor vanes 2 are each circulated again by further circulation ducts 4c and 4d. In other words, the circulation duct 4c comprises a combination of the exhaust duct member 6c, the return duct member 7c and the inflow duct member 8c constituting a single unit, and the circulation duct 4d comprises a combination of the exhaust duct member 6d, the return duct member 7d and the inflow duct member 8d constituting a single unit. The exhaust duct members 6c and 6d are provided facing the inflow duct members 8a and 8b across the rotor vanes 2.

In the embodiment shown in FIG. 1, the circulation ducts 4c and 4d are also each connected across the rotor vanes 2 to circulation ducts 4e (constituted by the combination of an exhaust duct member 6e, a return duct member 7e and an inflow duct member 8e) and 4f (constituted by the combination of an exhaust duct member 6f (not shown in the drawing), a return duct member 7f and an inflow duct member 8f). After circulating through the circulation ducts 4e and 4f, when the working fluid passes through the rotor vanes 2 it provides power to the rotor vanes 2, after which it is discharged through the exhaust port 5.

In this way, the power is extracted from the working fluid supplied through the supply duct 3 by the rotor vanes 2, however after passing through the rotor vanes 2 and flowing out towards the back thereof, the working fluid is guided by the circulation duct 4 to the circumferential direction to an inlet of a different part, and flows into the rotor vanes 2, whereupon power is extracted for a second time by the rotor vanes 2. After repeating this circulation process at least once, the working fluid is discharged through the exhaust port 5. By repeating this circulation process a plurality of times, the single cascade 2 operates in the same way as a multistage turbine. The energy (pressure) contained in the fluid decreases each time it passes through the rotor vanes 2, and without increasing the number of cascades of rotor vanes 2, the rotor vanes of a single cascade can efficiently recover energy.

In the above-mentioned embodiment, the working fluid that is supplied through the supply duct 3 and passes through the rotor vanes 2 divides to both sides through the circulation ducts 4a and 4b. However, a circulation process maybe repeated whereby the fluid is returned to one side of the rotor vanes 2 through one circulation duct without dividing, and after passing through the rotor vanes 2 it is again returned via a different circulation duct.

Figure 2:
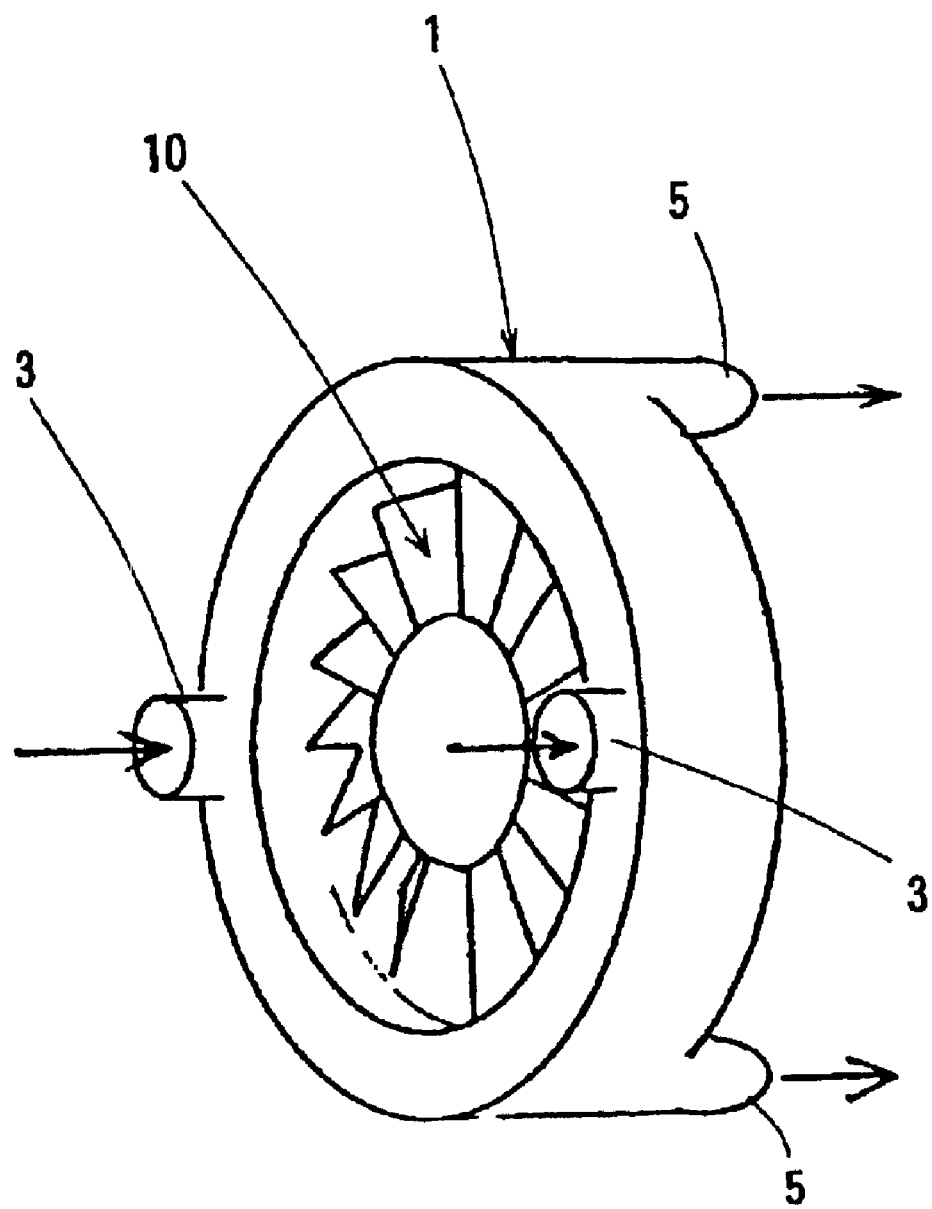
FIG. 2 is a perspective view of an application of a single cascade multistage turbine according to the present invention.

The application shown in FIG. 2 is an example of the same single cascade multistage turbine as in the embodiment shown in FIG. 1, but applied to a fan. The rotor vanes 2 of the single cascade multistage turbine 1 are attached to the tip of the fan rotor vanes 10. By using air or combustion gas with a high-pressure and low flow rate as the working fluid, a fan can be driven at a low peripheral velocity. In this case the supply duct 3 that provides the supply inlet of the working fluid can be comprised of not just one but a plurality (two in the example) of supply ducts disposed apart from each other in the circumferential direction. In this case, the working fluid supplied from the supply ducts 3a and 3b may be divided by two circulation ducts 4a, and 4b on the left and right, and each half of the working fluid divided from each supply duct 3a and 3b, may finally be merged and discharged from the exhaust port 5. Instead of the above, the working fluid supplied from the supply ducts 3a and 3b may, without being divided, be circulated by each circulation duct in only one direction slightly removed from each other in the circumferential direction, and then each working fluid may be discharged from the exhaust port 5.

As described above, the single cascade multistage turbine according to the present invention is comprised of a construction wherein the working fluid is caused to flow on one side of the single cascade of rotor vanes to one part of the circumferential direction of the rotor vanes; the working fluid that has passed through the rotor vanes is returned to the former side of the rotor vanes; then the working fluid is again passed through the rotor vanes at a slightly different position in the circumferential direction of the rotor vanes, and this process of circulating the working fluid is repeated at least once. As a consequence, power from the working fluid can be extracted each time the working fluid passes through the rotor vanes, and one set of turbine rotor vanes can be used in the same way as multistage rotor vanes. As a result, using the single stage rotor vanes, the energy of a working fluid with high-pressure and small volume can be efficiently converted into power. Further, the individual constituent parts of this single cascade multistage turbine are the same as the conventional structure, and only their arrangement and combination have been changed. Thus the same kind of function as multistage rotor vanes can be obtained by this simple construction. Accordingly, the turbine can be constructed with a compact configuration, can be manufactured easily without raising manufacturing costs, and does not lead to a reduction in ease of maintenance.

What is claimed is:

1. A single cascade multistage turbine comprising:

a single cascade of rotor vanes;

two supply ducts for causing a working fluid to flow on one side of said rotor vanes to one part of the circumferential direction of said rotor vanes;

one or more circulation ducts each having an exhaust duct member through which said working fluid that has passed through said rotor vanes is drained out, a return duct member to return said working fluid to the former side of said rotor vanes, and an inflow duct member connected to said return duct member, which supplies said working fluid to said rotor vanes at a slightly different position in the circumferential direction of said rotor vanes;

two exhaust ports to discharge said working fluid that has returned through the last circulation duct of said circulation ducts and passed through said rotor vanes;

wherein said two supply ducts are disposed at 180° intervals in the circumferential direction, and said two exhaust ports are positioned on the opposite side in substantially intermediate positions in the circumferential direction of said supply ducts, a plurality of said circulation ducts are disposed over the entire circumferential range of said rotor vanes, and said rotor vanes are attached to the tips of moving vanes, and said moving vanes are driven directly to rotate by said working fluid.

2. The single cascade multistage turbine according to claim 1, wherein said moving vanes are a rotor vane cascade of a fan.

3. The single cascade multistage turbine according to claim 1, wherein said moving vanes are a rotor vane cascade of a compressor.

4. The single cascade multistage turbine according to claim 2, wherein the working fluid supplied from said two supply ducts and passed through said rotor vanes is divided at the two circumferential ducts to reach said two exhaust ports, and is drained through said two exhaust ports in common.

5. The single cascade multistage turbine according to claim 3, wherein the working fluid supplied from said two supply ducts and passed through said rotor vanes is divided at the two circulation ducts to reach said two exhaust ports, and is drained through said two exhaust ports in common.

* * * * *